United States Patent Office 3,440,959
Patented Apr. 29, 1969

3,440,959
COATED POLYMER
Richard L. Wagner, Sherwood Park, Del., assignor to Hercules Incorporated, Wilmington, Del., a corporation of Delaware
No Drawing. Continuation-in-part of application Ser. No. 528,418, Feb. 18, 1966. This application Dec. 14, 1966, Ser. No. 601,577
Int. Cl. B41n 1/00, 3/00
U.S. Cl. 101—453   8 Claims

ABSTRACT OF THE DISCLOSURE

Coated polymers, comprising polyolefins, polystyrene, styrene copolymers, blends of polystyrene with styrene-butadiene copolymers, poly(vinyl chloride) poly(vinylidene chloride), vinyl chloride-vinylidene chloride copolymers, and poly[bis(chloromethyl) oxetane] coated with a thin layer of silicon monoxide and, which, in the form of sheets, are useful as lithographic plates. The said coated polymers may be prepared by vacuum depositing a coating of silicon monoxide of from about $3 \times 10^{-6}$ inch to about $40 \times 10^{-6}$ inch on the surface of the polymer.

---

This is a continuation-in-part of my copending application Serial No. 528,418 filed February 18, 1966, now Patent No. 3,394,200.

As stated above, this invention relates to certain specific polymers coated with a thin layer of silicon monoxide and to a process for preparing said coated polymers which comprises vacuum depositing a thin coating of silicon monoxide on their surface.

Polyolefins, polystyrene, styrene copolymers, blends of polystyrene with styrene-butadiene copolymers, poly (vinylidene chloride), vinyl chloride-vinylidene chloride copolymers, poly(vinyl chloride) and poly[bis(chloromethyl) oxetane] are well known for their ability to be formed into films, sheets, bottles, tubing and other useful articles. However, all of these polymers suffer the disadvantage of picking up static electrical charges, permeability to gases, being difficult to print upon and relatively nonadherent to coatings.

It has now been discovered that the said specific polymers can be made anti-static, less permeable to gases, more receptive to printing and adherent to coatings by vacuum depositing a very thin layer of silicon monoxide on their surface. Quite surprisingly, it has been found that silicon monoxide forms a chemical bond when vacuum deposited on one of the specific polymers listed above but not when vacuum deposited on other polymers such as poly(ethylene terephthalate), polyacetal resin or capran polyamide. The said bond is so tight that when a rupture occurs the failure is in the polymer and not between the polymers and the silicon monoxide coating.

The specific polymers which can be coated in accordance with this invention are the stereoregular polyolefins such as linear polyethylene, stereoregular polypropylene, crystalline ethylene-propylene copolymers, crystalline ethylene-1-butene copolymers, crystalline propylene-1-butene copolymers, crystalline isoprene-propylene copolymers, etc.; polystyrene; styrene copolymers including terpolymers such as acrylonitrile-butadiene-styrene terpolymers; blends of polystyrene with styrene-butadiene copolymers; poly(vinyl chloride); poly(vinylidene chloride); vinyl chloride-vinylidene chloride copolymers; poly[bis(chloromethyl) oxetane] and blends of these polymers with each other. The polymers can, of course, contain additives such as extenders, fillers, dyes, stabilizers, reinforcing materials, etc., but the presence or absence of such additives is immaterial to the invention. While polymers of various shapes and sizes can be coated in accordance with this invention, most preferably the polymers will be in the form of sheets or films. In some cases, it may be desirable to orient the sheet or film by methods known in the art.

The vacuum deposition of the silicon monoxide onto the surface of the said polymers can be carried out using any of the well-known vacuum deposition procedures. The thickness of the coating will be from $3 \times 10^{-6}$ inch, to about $40 \times 10^{-6}$ inch, most preferably from about $8 \times 10^{-6}$ inch, to about $30 \times 10^{-6}$ inch. The thickness can be controlled by the temperature, the distance of the polymer from the source and the period of deposition. In general, pressure within the vacuum chamber during deposition will be maintained at about $5 \times 10^{-4}$ millimeters of mercury or less, and the period of deposition will vary with the temperature and the distance of the polymer from the source. If the silicon monoxide coated polymer is to be stored for any length of time, it is usually desirable to apply a protective coating to prevent oxidation or the absorption of materials on the surface. One method of protective coating is simply to dip the coating polymer in an aqueous solution of carboxymethylcellulose and then allow it to dry. Such a coating can easily be washed away before the coated polymer is to be used.

The coated polymers of this invention are particularly useful as flexible, inexpensive, light-weight lithographic plates, provided the sheet is smooth and the silicon monoxide coating is of the proper thickness. More specifically, the requirements are (1) that the surface of the polymer sheet have no perceptible roughness and (2) that the silicon monoxide coating be of a thickness of from $3 \times 10^{-6}$ inch to about $40 \times 10^{-6}$ inch. The thickness of the polymer sheet is not critical but will, in general, be at least about 3 mils and should preferably be uniform to within $\pm 10\%$ variation. In certain cases it may be desirable to pigment the sheet. For example, such pigmentation can be used to furnish a contrasting color for the diazo image layer and to reduce halation. As stated above, one requirement is that the sheets be smooth (i.e. have no perceptible roughness). Smoothing of the sheets can be effected by various methods well known in the art as for example calendering, press polishing, molding between smooth plates, extruding onto polished quench rolls, etc.

The lithographic plates of this invention can readily be converted into either positive or negative working plates. For example, a negative working plate can be obtained by coating with a photo resist and exposing through a negative transparency so as to render the photo resist insoluble and oleophilic in the exposed areas. When the non-exposed image is dissolved away, the hydrophilic silicon monoxide surface is laid bare and a negative working plate results. A positive working plate can be made by coating with a photo resist, exposing through a positive transparency and removing the unexposed (soluble) resist as described above to reveal the silicon monoxide coating. By etching away the silicon monoxide coating, the oleophilic area is revealed. Then the exposed (hardened) photo resist is removed, exposing the hydrophilic silicon monoxide surface as a positive working plate. It is also possible to coat a plate with a photo resist containing a material which releases hydrogen fluoride (such as a diazofluoborate) when exposed to light. Such a photo resist would automatically etch through the silicon monoxide coating on exposure thus eliminating a step in the development process.

The following examples are presented for purposes of illustration, parts and percentages being by weight unless otherwise specified.

Example 1

A silicon monoxide coated polypropylene lithographic plate was prepared as follows. An extruded sheet of 0.015 inch thick crystalline polypropylene having a molecular weight of 600,000 was cut into a 10 x 16 inch plate and press-polished until there was no visual evidence of surface flaws.

The smooth polypropylene plate was then placed in a vacuum chamber equipped with five electrically heated tungsten filaments. The plate was mounted in an approximate arc around the filaments at a distance of 10–12 inches. Each filament heated a sample of silicon monoxide to its vaporization temperature and was fired independently in series. Deposition time was approximately 2 minutes per filament. The chamber was subjected to a vacuum of $4.5 \times 10^{-4}$ mm. during the process. The resulting plate had a $15 \times 10^{-6}$ inch coating which was scratch and abrasive resistant.

The silicon monoxide coated lithographic plate was converted to a printing plate by coating with a commercial ink-receptive diazo resin coating. After exposure through an image-bearing transparency and development of the plate, 10,000 copies were run on a lithographic printing press. The resulting prints were of excellent quality. The plate was examined and found to be undamaged, the coating still adhered tightly to the polypropylene substrate.

Example 2

A sheet of 0.01 inch thick linear, high-density, polyethylene having a molecular weight of approximately 150,000 was cut into a 10 x 16 inch plate and press-polished as described in Example 1. The smooth plate was then coated with a $20 \times 10^{-6}$ inch layer of silicon monoxide using the method described in Example 1. The resulting lithographic plate was converted to a printing plate by coating with a commercial ink-receptive diazo resin coating and imaged as described in Example 1. The printing plate was used to print 20,000 copies on a lithographic printing press. The prints were of excellent quality and the plate was undamaged.

Example 3

The polypropylene sheet described in Example 1 was press-polished and coated with a $5 \times 10^{-6}$ inch layer of silicon monoxide using the method described in Example 1.

The resulting lithographic plate was converted to a printing plate by coating with a commercial ink-receptive photo resist. After exposure through a positive transparency, the water soluble background areas were removed. The plate was then immersed in 0.75% aqueous hydrofluoric acid for three minutes to etch away the silicon monoxide coating, exposing an oleophilic area. Finally, the hardened resist was removed with an organic solvent exposing the hydrophilic silicon monoxide coating. The resulting positive working plate functioned satisfactorily during a run of 10,000 prints. The plate was examined and found to be undamaged.

Example 4

A sheet of 0.02 inch thick crystalline ethylene-propylene copolymer having a molecular weight of approximately 600,000 and containing 5 mole percent ethylene was cut into a 10 x 16 inch plate and calendered until there was no visual evidence of surface flaws. The smooth plate was then coated with a $12 \times 10^{-6}$ inch layer of silicon monoxide using the method described in Example 1.

The resulting lithographic plate was converted into a printing plate by coating with a commercial ink-receptive photo resist. After exposure through a negative transparency, the water soluble areas were removed exposing the hydrophilic silicon monoxide coating. The resulting printing plate was used to print 15,000 copies on a lithographic printing press. The prints were of excellent quality and the plate was undamaged.

Example 5

A silicon monoxide coated poly[bis(chloromethyl)-oxetane] lithographic plate was prepared as follows. An extruded sheet of 0.02 inch thick poly[bis(chloromethyl)-oxetane] having a molecular weight of 270,000 was cut into a 10 x 16 inch plate and calendered until there was no visual evidence of surface flaws. The smooth plate was then coated with a $4 \times 10^{-6}$ inch layer of silicon monoxide using the method described in Example 1.

The resulting lithographic plate was converted into a printing plate by coating with a commercial ink-receptive photo resist. After exposure through a negative transparency, the water soluble areas were removed exposing the hydrophilic silicon monoxide coating. The resulting printing plate was used to print 15,000 copies on a lithographic printing press. The prints were of excellent quality and the plate was undamaged.

Example 6

A silicon monoxide coated poly(vinyl chloride) film was prepared as follows. A 1 mil film of poly(vinyl chloride) having specific viscosity of 0.4 as measured by ASTM D–1243–52T was coated with a $5 \times 10^{-6}$ inch layer of silicon monoxide using the method described in Example 1.

The resulting coated film and an uncoated control were tested for gas permeability according to ASTM D-1434. The results are tabulated below:

|  | Cc./sq. m./24 hrs./atm. | | |
| --- | --- | --- | --- |
|  | $O_2$ | $CO_2$ | $N_2$ |
| Uncoated control | 120 | 320 | 20 |
| Coated film | 78 | 175 | (1) |

[1] None after 8 hours.

Example 7

A silicon monoxide coated polystyrene sheet was prepared as follows. A 10 mil sheet of polystyrene having a molecular weight of approximately 300,000 was coated with a $3 \times 10^{-6}$ inch layer of silicon monoxide using the method described in Example 1.

The resulting coated sheet and an uncoated control were tested for antistatic properties. Each sheet was charged with 1000 volts of static electricity and then the time measured for the charge to dissipate. The results are tabulated below:

|  | Relative humidity at 80° F., percent | Volts after a period of 5 minutes | Half life [a] |
| --- | --- | --- | --- |
| Uncoated control | 47 | 900 | Too long to measure. |
| Coated sheet | 47 | 10 | 45 seconds. |
| Uncoated control | 12 | 930 | Too long to measure. |
| Coated sheet | 12 | 65 | 75 seconds. |

[a] Time in seconds for charge to dissipate to 500 volts.

Example 8

A silicon monoxide coated polypropylene film was prepared as follows. A 2 mil film of crystalline polypropylene having a molecular weight of 600,000 was coated with a $6 \times 10^{-6}$ inch layer of silicon monoxide using the method described in Example 1.

The resulting coated film and an uncoated control were tested for printability by marking with a commercial flexographic ink (polyamide type). After allowing the ink to dry for one hour the marked surfaces were rubbed with a cotton cloth. The mark on the coated film could not be rubbed off, while the mark on the uncoated control was easily removed by rubbing.

Example 9

A silicon monoxide coated lithographic plate was prepared from a 0.02-inch thick extruded sheet of a blend of polystyrene and styrene-butadiene copolymer. The polystyrene had a molecular weight of approximately 300,000 and amounted to 90% of the blend. The styrene-butadiene copolymer had a molecular weight of 300,000 and contained approximately 28% of styrene monomer.

The sheet was cut into a 10 x 16 inch plate and press-polished until there was no visual evidence of surface flaws. The smooth plate was then coated with a $15\times10^{-6}$ inch layer of silicon monoxide using the method described in Example 1. The resulting lithographic plate was converted to a printing plate by coating with a commercial ink-receptive diazo resin coating and imaged as described in Example 1. The printing plate was used to print 20,000 copies on a lithographic printing press. The prints were of excellent quality and the plate was undamaged.

What I claim and desire to protect by Letters Patent is:

1. As an article of manufacture a polymer substrate selected from the group consisting of polyolefins, polystyrene, styrene copolymers, blends of polystyrene with styrene-butadiene copolymers, poly(vinyl chloride), poly(vinylidene chloride), vinyl chloride-vinylidene chloride copolymers, and poly[bis(chloromethyl)oxetane] having vacuum deposited on its smooth surface a coating of silicon monoxide of from $3\times10^{-6}$ to about $40\times10^{-6}$ inch in thickness and on said silicon monoxide surface an ink receptive photo resist coating.

2. As an article of manufacture a polymer substrate selected from the group consisting of polyolefins, polystyrene, styrene copolymers, blends of polystyrene with styrene-butadiene copolymers, poly(vinyl chloride), poly(vinylidene chloride), vinyl chloride-vinylidene chloride copolymers, and poly[bis(chloromethyl)oxetane] having vacuum deposited on its smooth surface a coating of silicon monoxide of from $3\times10^{-6}$ to about $40\times10^{-6}$ inch in thickness which has been partially etched away to form image areas.

3. The article of claim 1 wherein the polymer is a polyolefin.

4. The article of claim 3 wherein the polyolefin is polypropylene.

5. The article of claim 3 wherein the polyolefin is polyethylene.

6. The article of claim 1 wherein the polymer is polystyrene.

7. The article of claim 1 wherein the polymer is poly(vinyl chloride).

8. The article of claim 1 wherein the polymer is poly[bis(chloromethyl)oxetane].

References Cited

UNITED STATES PATENTS

| | | | |
|---|---|---|---|
| 2,748,031 | 5/1956 | Kafig | 117—12 XR |
| 2,760,432 | 8/1956 | Wood | 101—457 |
| 2,786,778 | 3/1957 | Palmquist | 117—12 |

ROBERT E. PULFREY, *Primary Examiner.*

FREDERICK FREI, *Assistant Examiner.*

U.S. Cl. X.R.

96—33, 75, 87; 117—106, 138.8